United States Patent
Sakazaki et al.

(10) Patent No.: US 6,607,218 B2
(45) Date of Patent: Aug. 19, 2003

(54) FUEL HOSE CONNECTION STRUCTURE AND FUEL HOSE

(75) Inventors: Kazushige Sakazaki, Komaki (JP); Atsuo Miyajima, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/832,890

(22) Filed: Apr. 12, 2001

(65) Prior Publication Data

US 2002/0017787 A1 Feb. 14, 2002

(30) Foreign Application Priority Data

Aug. 7, 2000 (JP) .................................... 2000-238853
Sep. 21, 2000 (JP) .................................... 2000-286439

(51) Int. Cl.[7] .................................................. F16L 21/00
(52) U.S. Cl. .................... 285/226; 285/222.1; 285/236
(58) Field of Search .......................... 285/226, 222.1, 285/235, 236, 227, 242; 138/109

(56) References Cited

U.S. PATENT DOCUMENTS

| | | | | |
|---|---|---|---|---|
| 4,047,739 A | * | 9/1977 | Aitken | 285/21 |
| 4,966,202 A | * | 10/1990 | Bryan et al. | 138/172 |
| 5,568,944 A | * | 10/1996 | Kawasaki | 285/21.1 |
| 5,664,608 A | * | 9/1997 | Kawasaki | 138/139 |
| 5,791,696 A | * | 8/1998 | Miyajima et al. | 285/226 |
| 5,829,483 A | * | 11/1998 | Tukahara et al. | 138/109 |
| 5,871,240 A | * | 2/1999 | Miyajima et al. | 285/226 |
| 5,983,950 A | * | 11/1999 | Aoki et al. | 138/109 |

FOREIGN PATENT DOCUMENTS

| | | | | |
|---|---|---|---|---|
| EP | 0 591 831 | | 4/1994 | |
| EP | 0 661 490 | | 7/1995 | |
| JP | 6-221482 | * | 9/1994 | ................. 285/236 |
| JP | 8-312844 | * | 11/1996 | ................. 138/109 |

* cited by examiner

Primary Examiner—William L. Miller
Assistant Examiner—Carlos Lugo
(74) Attorney, Agent, or Firm—Oblon, Spivak, McClelland, Maier & Neustadt, P.C.

(57) ABSTRACT

A fuel hose including a straight insertion end portion at one axial end, an outer layer formed of an elastic body, a groove portion formed coaxially on the inner wall at an axially inward end of the insertion end portion, a thin-walled inner layer made of a resin material of low gasoline permeability and provided to a portion of the inner wall, the portion including the groove portion and extending axially inward from the groove portion, and an annular seal member fitted into the groove portion with the inner layer. The insertion end portion is configured to receive a mating pipe having an engagement protrusion protruding radially outward at an end portion under pressure such that the engagement protrusion presses the seal member fitted into the groove portion to be engaged with the groove portion in a fluid-tight condition. The outer layer is configured to be fitted with a clamp.

18 Claims, 7 Drawing Sheets

FUEL HOSE CONNECTION STRUCTURE AND FUEL HOSE

BACKGROUND OF THE INVENTION

1. Field of the Invention

The present invention relates to a fuel hose connection structure for connecting a fuel hose and a tubular mating member, such as a metal or resin pipe, in a fluid-tight condition to thereby suppress permeation of gasoline to the exterior thereof from a connected portion thereof, as well as to a fuel hose for use in the hose connection structure.

2. Description of the Related Art

Conventionally, a fuel hose of such a type assumes the form of a multilayer hose as disclosed in, for example, Japanese Patent Application Laid-Open (kokai) No. 6-190974. Specifically, the conventional fuel hose includes an outer layer of rubber, and an inner layer of a resin or a metal formed on the inner wall of the outer layer, excluding an axial end portion of the outer layer into which a mating pipe is inserted. Since the inner layer is hard, when a mating pipe is fitted into the inner layer, sufficient sealing performance therebetween will not be maintained. Thus, a connection structure of the fuel hose avoids overlapping of the inner layer and the mating pipe, but is designed such that an end of the mating pipe inserted into the outer layer abuts an end portion of the inner layer.

According to the connection structure, permeation of gasoline to the exterior thereof can be prevented by means of the inner layer of low gasoline permeability and the mating pipe extending in succession to the inner layer. Also, since the end portion of the outer layer into which the mating pipe is inserted is not lined with the inner layer, an insertion load which arises during insertion of the mating pipe is reduced accordingly. Thus, a predetermined low gasoline permeability is established by means of the inner layer and the mating pipe inserted into the outer layer up to the position of the inner layer. Also, work efficiency in insertion of the mating pipe into the fuel hose is enhanced. However, the fuel hose connection structure involves slight permeation of gasoline through a contact portion between the inner layer and the mating pipe, and thus fails to satisfy a strict requirement for advanced low gasoline permeability.

Japanese Patent Application Laid-Open (kokai) No. 8-294979 discloses a fuel hose (see FIG. 17) including a fluoroplastic tube 82, a protector 81 for covering the fluoroplastic tube 82, and a seal rubber 83 of low gasoline permeability bonded through vulcanization to the inner wall of an end portion of the fluoroplastic tube 82 into which a mating pipe is fitted. When the mating pipe is fitted into the fuel hose, the seal rubber 83 of low gasoline permeability lies between the fluoroplastic tube 82 and the inserted mating pipe, thereby reliably suppressing permeation of gasoline and thus satisfying a strict requirement for advanced low gasoline permeability.

Figure 17:
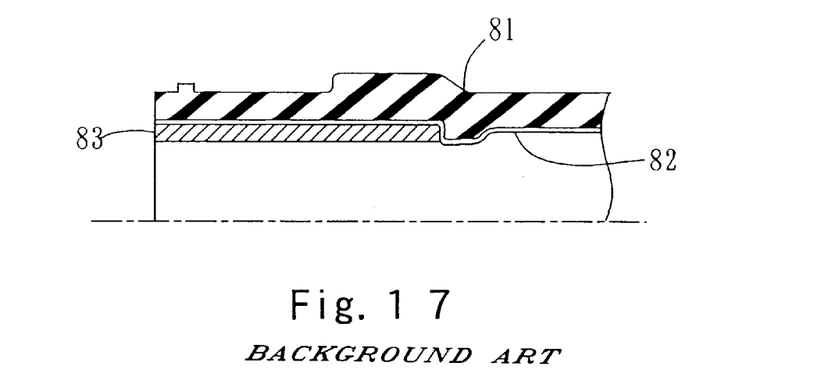
FIG. 17 is a sectional view showing an upper half of a conventional fuel hose.

However, since the mating pipe is inserted into the fluoroplastic tube 82, which is hard, in spite of the presence of the seal rubber 83 therebetween, an insertion load which arises during insertion of the mating pipe is very high, resulting in impaired work efficiency in insertion of the mating pipe. Also, since the seal rubber 83 is of low gasoline permeability and is thus expensive, the fuel hose becomes expensive. Furthermore, in order to prevent relative movement between the fluoroplastic tube 82 and the seal rubber 83 during insertion of the mating pipe, they must be bonded together, thereby causing a further increase in the cost of the fuel hose.

Japanese Patent Application Laid-Open (kokai) No. 8-312844 discloses another conventional fuel hose (see FIGS. 18 and 19), which includes an outer hose portion 91 of rubber having a first bellows portion 92 and a first straight cylindrical portion 93 extending from at least one end of the first bellows portion 92, and an inner hose portion 94 of resin disposed within the outer hose portion 91 substantially coaxially and having a second bellows portion 95 and a second straight cylindrical portion 96 extending from at least one end of the second bellows portion 95. The fuel hose is configured in the following manner: the second straight cylindrical portion 96 is disposed within the first straight cylindrical portion 93; a ring member 97 is disposed inside the second straight cylindrical portion 96, whereas a clamp member 98 is disposed to surround the outer surface of the first straight cylindrical portion 93 in order to tighten the first straight cylindrical portion 93 radially inward; and the first straight cylindrical portion 93 and the second straight cylindrical portion 96 are held between the ring member 97 and the clamp member 98 to thereby be integrated into a single unit. The publication also discloses a fuel hose in which either the ring member or the clamp member is omitted. A mating pipe 99 is fitted into the outer hose portion 91 of the fuel hose until the mating pipe 99 abuts an axial end portion of the second straight cylindrical portion 96 of the inner hose portion 94, thereby forming a connection structure of the fuel hose and the mating pipe.

Figure 18:
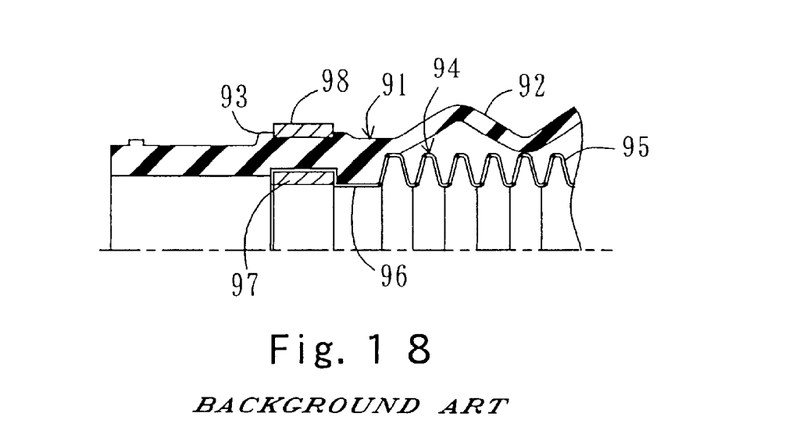
FIG. 18 is a sectional view showing an upper half of another conventional fuel hose.

Since the outer hose portion 91 is made of rubber, the mating pipe 99 can be easily fitted thereinto, and the mating pipe 99 and the outer hose portion 91 are sealed against each other. Furthermore, an end portion of the mating pipe 99 abuts an end portion of the inner hose portion 94 made of a resin impermeable to gasoline, thereby preventing permeation of gasoline through the connected end portion to the exterior of the fuel hose connection structure.

Figure 19:
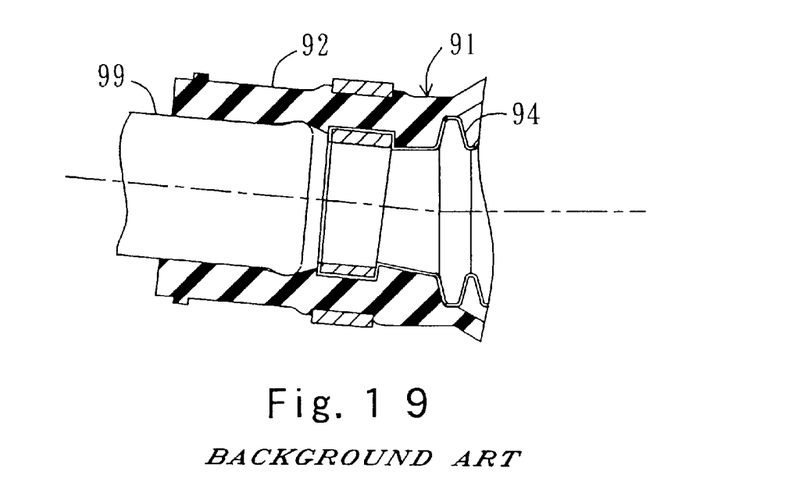
FIG. 19 is a sectional view of a conventional fuel hose connection structure showing a state in which a load is applied to the connection portion thereof.

However, in the fuel hose connection structure, sealing is established merely through abutment of the end portion of the mating pipe 99 against the end portion of the inner hose portion 94 made of a resin impermeable to gasoline. As a result, as shown in FIG. 19, when a load is imposed on the mating pipe 99 or the fuel hose, a resultant relative movement between the mating pipe 99 and the fuel hose cannot be absorbed at the abutment portion, resulting in formation of a gap between the end of the inner hose portion 94 and that of the mating pipe 99. A slight amount of gasoline permeates through the gap. Thus, the conventional fuel hose connection structures cannot satisfy a strict requirement for advanced low gasoline permeability when the requirement is in effect.

SUMMARY OF THE INVENTION

An object of the present invention is to solve the above-mentioned problems in the conventional fuel hose connection structure and fuel hose and to provide an inexpensive fuel hose connection structure capable of satisfying a strict requirement for advanced low gasoline permeability and facilitating insertion of a mating material into a fuel hose, as well as a fuel hose for use in the fuel hose connection structure.

To achieve the above object, the present invention provides a fuel hose connection structure in which a fuel hose has a straight insertion end portion at one axial end thereof and a tubular mating member is connected to the insertion end portion in a fluid-tight condition. The fuel hose comprises a tubular outer layer made of an elastic material; an annular groove portion formed on the inner wall of the outer layer at an axially inward end of the insertion end portion, the annular groove portion being formed coaxially with the inner wall along the entire circumference of the inner wall; a thin-walled inner layer made of a resin material of low gasoline permeability and fixedly bonded to the entirety of a portion of the inner wall of the outer layer, the portion including at least the groove portion and extending axially inward from the groove portion; and an annular seal member fitted tightly into the groove portion lined with the inner layer. The mating member has an annular engagement protrusion formed at one end portion thereof along the entire circumference in such a manner as to protrude radially outward. The mating member is inserted under pressure from the one end portion into the insertion end portion of the fuel hose such that the engagement protrusion is engaged with the groove portion while pressing radially outward on the seal member fitted into the groove portion. The fuel hose connection structure further comprises an annular clamp member fitted onto the outer layer at a position located axially outward with respect to the groove portion and adapted to tighten the outer layer securely so as to connect the inserted mating member and the fuel hose in a fluid-tight condition.

In the present invention, the engagement protrusion of the mating member is tightly fixed, via the inner layer and the annular seal member, to the groove portion formed on the inner wall of the outer layer at an axially inward end of the insertion end portion of the outer layer, whereby permeation of gasoline can be sufficiently prevented. Also, most of a press-fit path of the fuel hose along which the mating member is inserted under pressure is formed of the outer layer, which is soft. Insertion of the mating member involves radially outward expansion of the inner layer, which is hard, at merely one end portion of the path; i.e., at the groove portion. Thus, an insertion load which arises during insertion of the mating member can be low.

As a result, the present invention sufficiently prevents permeation of gasoline at a connection of the fuel hose and the mating member and thus can satisfy a strict requirement for advanced low gasoline permeability. Since an insertion load which arises during insertion of the mating member into the fuel hose is low, work efficiency in the insertion is enhanced. The seal member fitted into the groove portion assumes the form of a ring, which is axially short, and thus is inexpensive as compared with the conventional seal rubber.

Preferably, in the fuel hose connection structure, the outer layer and the inner layer protrude coaxially and radially inward at a position adjacent to and located axially inward with respect to the groove portion so as to form an annular positioning protrusion. The positioning protrusion reliably blocks an axially inward movement of the seal member and the mating member beyond an engagement end position; i.e., beyond the groove portion. That is, the positioning protrusion reliably prevents displacement of the seal member and the mating member from the groove portion. Also, the positioning protrusion enables a user to know that insertion of the mating member is completed.

The present invention further provides a fuel hose having a straight insertion end portion at one axial end thereof, comprising a tubular outer layer made of an elastic material; an annular groove portion formed on the inner wall of the outer layer at an axially inward end of the insertion end portion, the annular groove portion being formed coaxially with the inner wall along the entire circumference of the inner wall; a thin-walled inner layer made of a resin material of low gasoline permeability and fixedly bonded to the entirety of a portion of the inner wall of the outer layer, the portion including at least the groove portion and extending axially inward from the groove portion; and an annular seal member fitted tightly into the groove portion lined with the inner layer. A tubular mating member having an annular engagement protrusion formed at one end portion thereof along the entire circumference in such a manner as to protrude radially outward is inserted under pressure from the one end portion into the insertion end portion of the fuel hose such that the engagement protrusion is engaged with the groove portion while pressing radially outward on the seal member fitted into the groove portion. An annular clamp member is fitted onto the outer layer at a position located axially outward with respect to the groove portion in such a manner as to tighten the outer layer securely so as to connect the inserted mating member and the fuel hose in a fluid-tight condition.

The annular groove portion formed on the inner wall of the insertion end portion of the outer layer at an axially inward end of the insertion end portion is lined with the inner layer and has the annular seal member fitted tightly therein. Thus, through engagement with the groove portion of the engagement protrusion of the mating member inserted under pressure into the fuel hose, permeation of gasoline can be sufficiently prevented. Also, most of a press-fit path of the fuel hose along which the mating member is inserted under pressure is formed of the outer layer, which is soft. Insertion of the mating member involves radially outward expansion of the inner layer, which is hard, at merely one end portion of the path; i.e., at the groove portion. Thus, an insertion load which arises during insertion of the mating member can be low. As a result, the present invention sufficiently prevents permeation of gasoline at a connection of the fuel hose and the mating member and thus can satisfy a strict requirement for advanced low gasoline permeability. Since an insertion load which arises during insertion of the mating member into the fuel hose is low, work efficiency in the insertion is enhanced. The seal member fitted into the groove portion assumes the form of a ring, which is axially short, and thus is inexpensive as compared with the conventional seal rubber.

Preferably, in the fuel hose, the outer layer and the inner layer protrude coaxially and radially inward at a position adjacent to and located axially inward with respect to the groove portion so as to form an annular positioning protrusion. The positioning protrusion reliably blocks an axially inward movement of the seal member and the mating member beyond an engagement end position; i.e., beyond the groove portion. That is, the positioning protrusion reliably prevents displacement of the seal member and the mating member from the groove portion. Also, the positioning protrusion enables a user to know that insertion of the mating member is completed.

The present invention further provides a fuel hose connection structure in which a fuel hose has a straight insertion end portion at one axial end thereof and a tubular mating member is connected to the insertion end portion in a fluid-tight condition. The fuel hose comprises a tubular outer layer made of an elastic material; an annular groove portion formed on the inner wall of the outer layer at an axially inward end of the insertion end portion, the annular groove portion being formed coaxially with the inner wall along the entire circumference of the inner wall; an inner layer of low gasoline permeability assuming the form of a thin-walled tube made of resin and disposed coaxially within the outer layer, the inner layer having an axially outward end portion fitted into the groove portion; and an annular seal member fitted tightly into the groove portion into which the axially outward end portion of the inner layer is fitted. The mating member has an annular engagement protrusion formed at one end portion thereof along the entire circumference in such a manner as to protrude radially outward. The mating member is inserted under pressure from the one end portion into the insertion end portion of the fuel hose such that the engagement protrusion is engaged with the groove portion while pressing radially outward on the seal member fitted into the groove portion. The fuel hose connection structure further comprises an annular clamp member fitted onto the outer layer at a position located axially outward with respect to the groove portion and adapted to tighten the outer layer securely so as to connect the inserted mating member and the fuel hose in a fluid-tight condition.

In the present invention, the engagement protrusion of the mating member is tightly fixed, via the inner layer and the annular seal member, to the groove portion formed on the inner wall of the outer layer at an axially inward end of the insertion end portion of the outer layer, whereby permeation of gasoline can be sufficiently prevented. Also, most of a press-fit path of the fuel hose along which the mating member is inserted under pressure is formed of the outer layer, which is soft. Insertion of the mating member involves radially outward expansion of the inner layer, which is hard, at merely one end portion of the path; i.e., at the groove portion. Thus, an insertion load which arises during insertion of the mating member can be low.

As a result, the present invention sufficiently prevents permeation of gasoline at a connection of the fuel hose and the mating member and thus can satisfy a strict requirement for advanced low gasoline permeability. Since an insertion load which arises during insertion of the mating member into the fuel hose is low, work efficiency in the insertion is enhanced.

Preferably, in the fuel hose connection structure, the outer layer protrudes coaxially and radially inward at a position adjacent to and located axially inward with respect to the groove portion so as to form an annular positioning protrusion. The positioning protrusion reliably blocks an axially inward movement of the seal member and the mating member beyond an engagement position; i.e., beyond the groove portion. That is, the positioning protrusion reliably prevents displacement of the seal member and the mating member from the groove portion. Also, the positioning protrusion enables a user to know that insertion of the mating member is completed.

The present invention further provides a fuel hose having a straight insertion end portion at one axial end thereof, comprising a tubular outer layer made of an elastic material; an annular groove portion formed on the inner wall of the outer layer at an axially inward end of the insertion end portion, the annular groove portion being formed coaxially with the inner wall along the entire circumference of the inner wall; an inner layer of low gasoline permeability assuming the form of a thin-walled tube made of resin and disposed coaxially within the outer layer, the inner layer having an axially outward end portion fitted into the groove portion; and an annular seal member fitted tightly into the groove portion into which the axially outward end portion of the inner layer is fitted. A tubular mating member having an annular engagement protrusion formed at one end portion thereof along the entire circumference in such a manner as to protrude radially outward is inserted under pressure from the one end portion into the insertion end portion of the fuel hose such that the engagement protrusion is engaged with the groove portion while pressing radially outward on the seal member fitted into the groove portion. An annular clamp member is fitted onto the outer layer at a position located axially outward with respect to the groove portion in such a manner as to tighten the outer layer securely so as to connect the inserted mating member and the fuel hose in a fluid-tight condition.

In the present invention, the axially outward end portion of the inner layer is fitted into the groove portion formed on the inner wall of the insertion end portion of the outer layer at an axially inward end of the insertion end portion, and the annular seal member is fitted tightly thereinto. Thus, through engagement with the groove portion of the engagement protrusion of the mating member inserted under pressure into the fuel hose while pressing radially outward on the seal member, permeation of gasoline can be sufficiently prevented. Also, most of a press-fit path of the fuel hose along which the mating member is inserted under pressure is formed of the outer layer, which is soft. Insertion of the mating member involves radially outward expansion of the inner layer, which is hard, at merely one end portion of the path; i.e., at the groove portion. Thus, an insertion load which arises during insertion of the mating member can be low.

As a result, the present invention sufficiently prevents permeation of gasoline at a connection of the fuel hose and the mating member and thus can satisfy a strict requirement for advanced low gasoline permeability. Since an insertion load which arises during insertion of the mating member into the fuel hose is low, work efficiency in the insertion is enhanced.

Preferably, in the fuel hose, the outer layer protrudes coaxially and radially inward at a position adjacent to and located axially inward with respect to the groove portion so as to form an annular positioning protrusion. The positioning protrusion reliably blocks an axially inward movement of the seal member and the mating member beyond an engagement position; i.e., beyond the groove portion. That is, the positioning protrusion reliably prevents displacement of the seal member and the mating member from the groove portion. Also, the positioning protrusion enables a user to know that insertion of the mating member is completed.

DESCRIPTION OF THE PREFERRED EMBODIMENTS

Embodiments of the present invention will next be described in detail with reference to the drawings.

(1) First Embodiment

Figure 1:
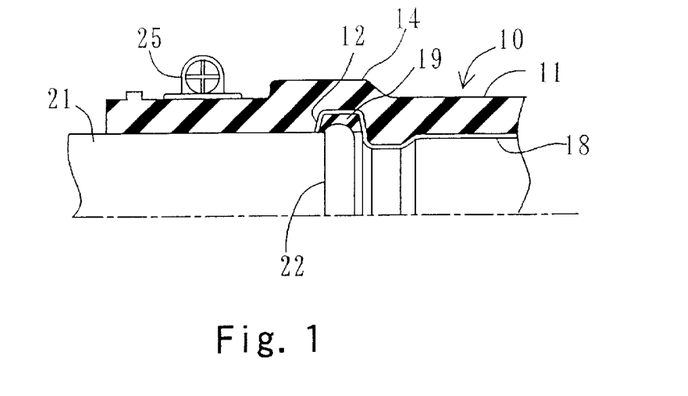
FIG. 1 is a sectional view showing an upper half of a fuel hose connection structure according to a first embodiment of the present invention.
Figure 2:
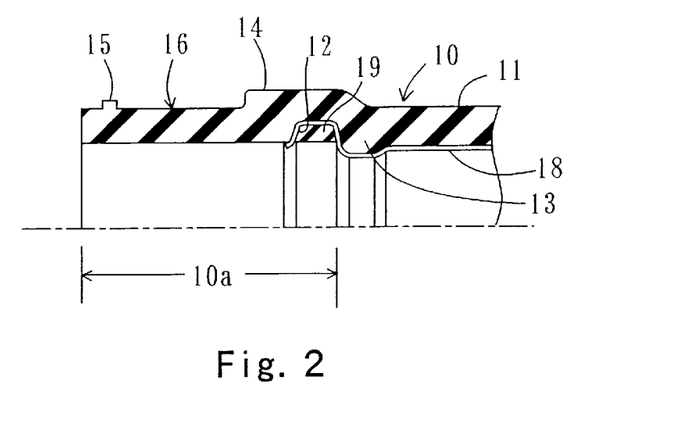
FIG. 2 is a sectional view showing an upper half of a fuel hose of the fuel connection structure of FIG. 1.

FIG. 1 is an axial sectional view showing an upper half of a fuel hose connection structure according to a first embodiment used in a gasoline supply line of a motor vehicle, and FIG. 2 is an axial sectional view showing an upper half of a fuel hose of the first embodiment. The fuel hose connection structure includes a fuel hose 10 having a straight insertion end portion 10a at one axial end thereof; a metallic mating pipe 21, which serves as a tubular mating member, press-fitted into the insertion end portion 10a; and an annular clamp member 25 fitted onto the outer surface of the insertion end portion 10a.

The fuel hose 10 includes an outer layer 11, which is a tube made of an elastic material; a groove portion 12 formed coaxially on the inner wall of the insertion end portion 10a of the outer layer 11 at an axially inward end of the insertion end portion 10a; a thin-walled inner layer 18 made of a resin material of low gasoline permeability and fixedly bonded to the entirety of a portion of the inner wall of the outer layer 11 extending axially inward from at least the groove portion 12; and an annular seal member 19 fitted tightly into the groove portion 12 lined with the inner layer 18.

Figure 3:
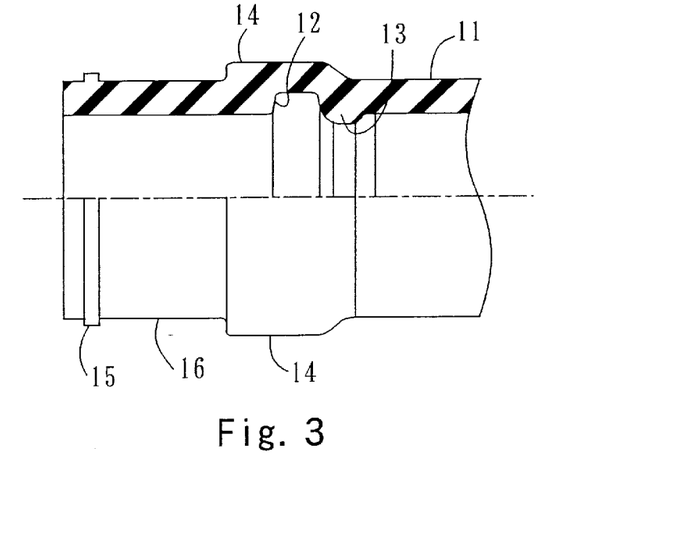
FIG. 3 is a partially sectional view showing an outer layer of the fuel hose of FIG. 2.

The outer layer 11 is made of, for example, fluorine-containing rubber (FKM), acrylonitrile butadiene rubber (NBR), acrylonitrile butadiene rubber/polyvinyl chloride (NBR/PVC), acrylic rubber (ACM), hydrogenated acrylonitrile butadiene rubber (H-NBR), or epichlorohydrin rubber (ECO). As shown in FIG. 3, the outer layer 11 includes an annular groove portion 12, which is formed on the inner wall of the insertion end portion 10a at an axially inward end of the insertion end portion 10a in such a manner as to be slightly indented radially outward along the entire circumference of the inner wall and to assume a substantially rectangular cross section. The outer layer 11 also includes an annular positioning protrusion 13, which slightly protrudes coaxially and radially inward from the inner wall thereof along the entire circumference at a position adjacent to and located axially inward with respect to the groove portion 12. The positioning protrusion 13 is not necessarily formed along the entire circumference, but may be formed along a partial circumference. Also, the positioning protrusion 13 may be omitted as needed.

The outer surface of the outer layer 11 protrudes radially outward along the entire circumference over an axial range of from a position corresponding to the axially inward end of the insertion end portion 10a to a position located slightly axially outward with respect to the groove portion 12, thereby forming an annular protrusion 14 so as to compensate a reduction in the wall thickness of the outer layer 11 associated with formation of the groove portion 12. Also, an annular slight protrusion 15 protrudes radially outward from the outer surface of the outer layer 11 along the circumference at a position located in the vicinity of the axially outward end of the insertion end portion 10a. A portion of the outer surface of the outer layer 11 extending between the annular protrusion 14 and the annular protrusion 15 serves as a clamp portion 16, onto which a ring-shaped clamp member 25, which will be described later, is fitted for clamping.

A thin-walled inner layer 18 made of a resin of low gasoline permeability is fixedly bonded to the entirety of a portion of the inner wall of the outer layer 11 extending axially inward from the groove portion 12. The inner layer 18 functions as a barrier layer against permeation of gasoline and is favorably formed of fluoroplastic of vinylidene fluoride or vinylidene fluoride-chlorotrifluoroethylene copolymer. The inner layer 18 is formed in the following manner. A thin resin layer is formed on the inner wall of the outer layer 11 by means of electrostatic coating. The thus-formed resin layer is subjected to heat treatment. The electrostatic coating is performed while the inner wall of the insertion end portion 10a of the outer layer 11 excluding the groove portion 12 is covered with a cap inserted from the opening of the outer layer 11 so as to prevent adhesion of the fluoroplastic.

Figure 4:
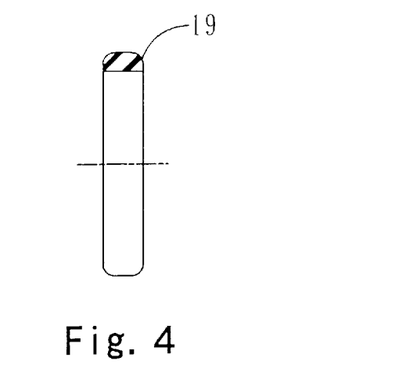
FIG. 4 is a partially sectional view showing a seal rubber of the fuel hose of FIG. 2.

The seal member 19 is made of, for example, fluorine-containing rubber, H-NBR, NBR/PVC, or NBR, which are resistant to gasoline. As shown in FIG. 4, the seal member 19 is annular and assumes an outer diameter slightly greater than the inside diameter of the groove portion 12 lined with the inner layer 18. The seal member 19 is not necessarily bonded to the groove portion 12, but may merely be fitted into the groove portion 12.

Figure 5A:
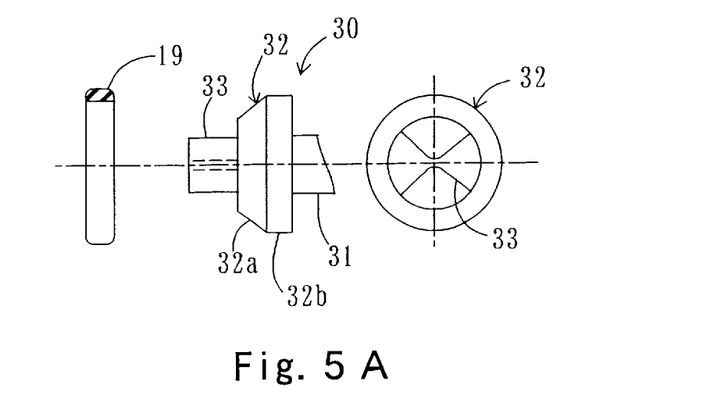
FIGS. 5A and 5B are views for explaining attachment of a seal member into a fuel hose.
Figure 5B:
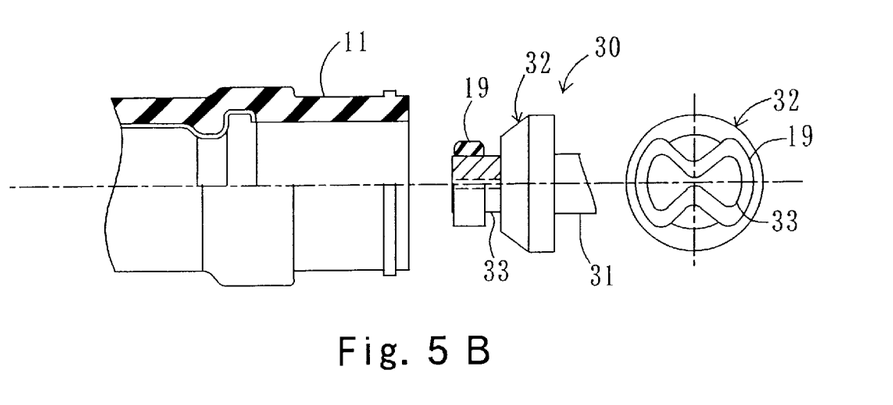

The seal member 19 is inserted into the groove portion 12 through the opening of the outer layer 11 by use of, for example, a mounting jig 30 as shown in FIG. 5. As shown in FIG. 5A, the mounting jig 30 includes a straight rod portion 31 of a small diameter, a press portion 32 of a diameter slightly greater than the inside diameter of the outer layer 11 located ahead of the rod portion 31, and a mounting portion 33 located ahead of the press portion 32. The press portion 32 is composed of a taper portion 32a, which is slightly tapered off toward the mounting portion 33, and a disk portion 32b located adjacent to the rod portion 31. The mounting portion 33 assumes the shape of the number "8" substantially and a maximum diameter substantially equal to the diameter of the taper portion 32a of the press portion 32 and fixedly projects from the front surface of the taper portion 32a. As shown in FIG. 5B, the seal member 19 is attached to the mounting portion 33 along the contour shaped in the number "8". The mounting jig 30 having the seal member 19 attached thereto is inserted under pressure into the outer layer 11 through the opening of the same while the press portion 32 radially expands the outer layer 11. When the mounting portion 33 reaches the groove portion 12, the mounting portion 33 is rotated to thereby release the seal member 19. Then, the taper portion 32a is pressed forward up to the positioning protrusion 13, whereby the seal member 19 is reliably fitted into the groove portion 12. In this manner, the seal member 19 can be fitted into the groove portion 12 easily and reliably. However, a method for fitting the seal member 19 into the groove portion 12 is not limited thereto.

The mating pipe 21 (mating member) is of metal or resin and has an annular engagement protrusion 22 formed at one end portion (at one end or in the vicinity of the end) thereof along the entire circumference in such a manner as to protrude radially outward from the outer surface thereof. The diameter of the engagement protrusion 22 is slightly greater than the inside diameter of the outer layer 11. The mating pipe 21 is inserted under pressure into the insertion end portion 10a of the outer layer 11 and is fixed in place while the engagement protrusion 22 is fitted into the groove portion 12 located at the axially inward end of the insertion end portion 10a, via the inner layer 18 and the annular seal member 19. Subsequently, the ring-shaped clamp member 25 is mounted on the outer surface of the clamp portion 16 of the outer layer 11 and clamps the clamp portion 16 to thereby firmly connect the fuel hose 10 and the mating pipe 21. The clamp member 25 is a sheet clamp which effects clamping by means of a screw, but is not limited thereto. For example, a wire clamp or a spring clamp, which effects clamping by means of an elastic force of a sheet material, is acceptable.

In the above-described first embodiment, the engagement protrusion 22 of the mating pipe 21 is fixedly fitted into the groove portion 12 formed at the axially inward end of the insertion end portion 10a of the outer layer 11 via the inner layer 18 made of a resin material of low gasoline permeability and the annular seal member 19, thereby sufficiently preventing permeation of gasoline and thus satisfying a strict requirement for advanced low gasoline permeability. Also, most of a press-fit path of the fuel hose 10 along which the mating pipe 21 is inserted under pressure is formed of the outer layer 11, which is soft. Insertion of the mating pipe 21 involves radially outward expansion of the inner layer 18, which is hard, at merely one end portion of the path; i.e., at the groove portion 12. Thus, an insertion load which arises during insertion of the mating pipe 21 can be low, thereby enhancing work efficiency in the insertion.

The outer layer 11 and the inner layer 18 protrude coaxially and radially inward at a position adjacent to and located axially inward with respect to the groove portion 12 of the fuel hose 10 so as to form the annular positioning protrusion 13. The positioning protrusion 13 reliably blocks an axially inward movement of the seal member 19 and the mating pipe 21 beyond an engagement end position; i.e., beyond the groove portion 12. Thus, the seal member 19 and the mating pipe 21 can be fitted into the groove portion 12 accurately and easily.

Next, a modified fuel hose connection structure of the above-described first embodiment will be described.

Figure 6:
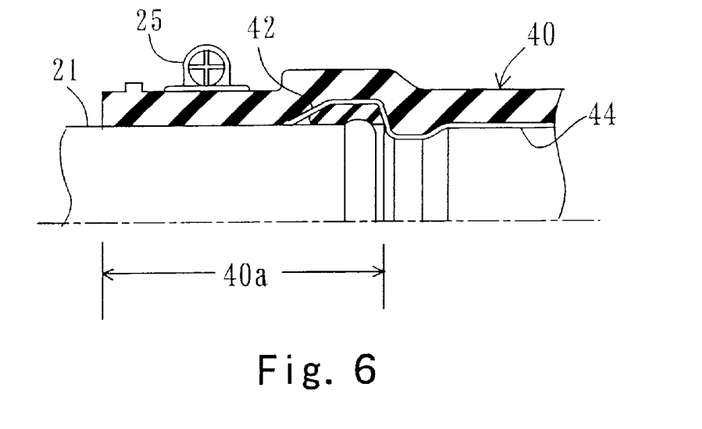
FIG. 6 is a sectional view showing an upper half of a fuel hose connection structure according to a modification of the first embodiment.
Figure 7:
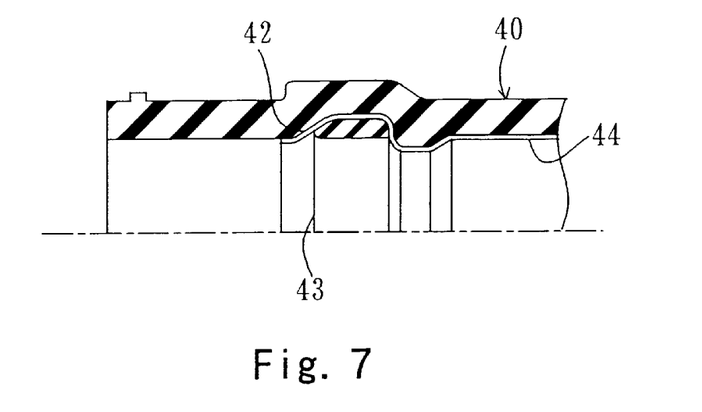
FIG. 7 is a sectional view showing an upper half of a fuel hose of the fuel hose connection structure of FIG. 6.
Figure 8:
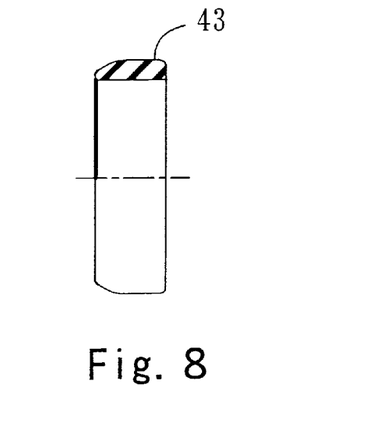
FIG. 8 is a partially sectional view showing a seal rubber of the fuel hose of FIG. 7.

As shown in FIGS. 6 to 8, according to the modified embodiment, a groove portion 42 formed at an insertion end portion 40a of a fuel hose 40 is formed such that the axial length is slightly longer than that of the above-mentioned groove portion 12 and such that one end portion is tapered off, thereby assuming an axial cross section of a trapezoidal shape. As shown in FIG. 8, a seal member 43 also assumes an axial cross section of a trapezoidal shape so as to correspond to the shape of the groove portion 42. Since one end portion of the groove portion 42 is tapered off, the inner layer 44 is readily deformed in the radially outward direction, thereby further facilitating mounting of the seal member 43 into the groove portion 42 and insertion of the mating pipe 21. Since a seal portion implemented by means of the groove portion 42 and the seal member 43 assumes an axial length longer than that of the first embodiment, permeation of gasoline from a connection with the mating pipe 21 can be suppressed more reliably.

(2) Second Embodiment

Figure 9:
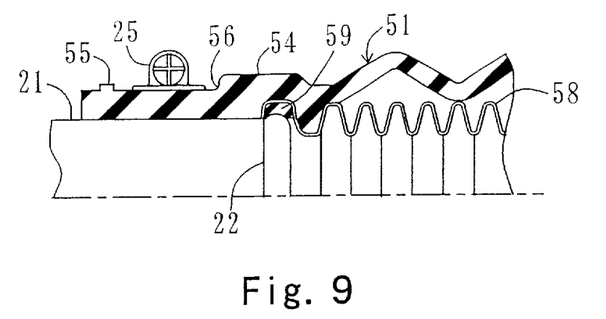
FIG. 9 is a sectional view showing an upper half of a fuel hose connection structure according to a second embodiment of the present invention.
Figure 10:
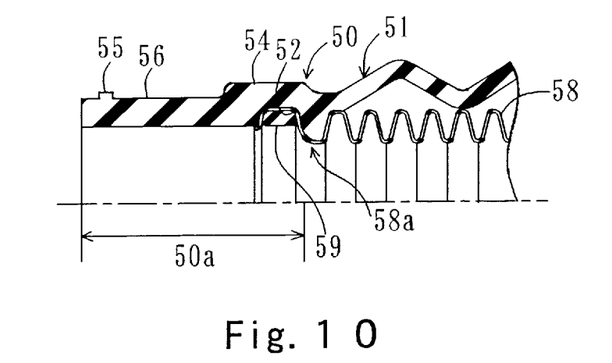
FIG. 10 is a sectional view showing an upper half of a fuel hose of the fuel connection structure of FIG. 9.

FIG. 9 is an axial sectional view showing an upper half of a fuel hose connection structure according to a second embodiment used in a gasoline supply line of a motor vehicle, and FIG. 10 is an axial sectional view showing an upper half of a fuel hose of the second embodiment. The fuel hose connection structure includes a fuel hose 50 having a straight insertion end portion 50a at one axial end thereof and assuming the form of bellows; a metallic mating pipe 21, which serves as a tubular mating member, press-fitted into the insertion end portion 50a; and an annular clamp member 25 fitted onto the outer surface of the insertion end portion 50a.

The fuel hose 50 includes an outer layer 51, which is a tube made of an elastic material; a groove portion 52 formed coaxially on the inner wall of a straight portion 51a corresponding to the insertion end portion 50a of the outer layer 51 at an axially inward end of the straight portion 51a; an inner layer 58 of low gasoline permeability assuming the form of a thin-walled tube made of resin and disposed coaxially within the outer layer 51, the inner layer 58 having an axially outward end portion fitted into the groove portion 52 to thereby be mechanically integrated with the outer layer 51; and an annular seal member 59 fitted tightly into the groove portion 52 into which the axially outward end portion of the inner layer 58 is fitted.

Figure 11:
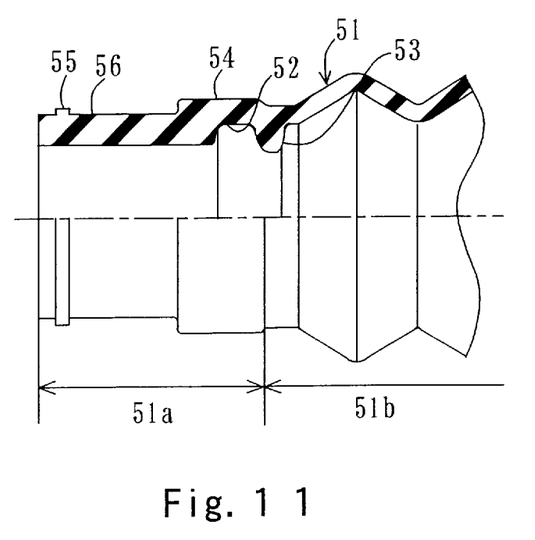
FIG. 11 is a partially sectional view showing an outer layer of the fuel hose of FIG. 10.

As shown in FIG. 11, the outer layer 51 includes the straight portion 51a corresponding to the insertion end portion 50a and bellows portion 51b having a thickness thinner than that of the straight portion 51a, and is formed through injection molding by use of the same material as that for the outer layer 11. The outer layer 51 includes an annular groove portion 52, which is formed on the inner wall of the straight portion 51a at an axially inward end of the straight portion 51a in such a manner as to be slightly indented radially outward along the entire circumference of the inner wall and to assume a substantially rectangular cross section. The outer layer 51 also includes an annular positioning protrusion 53, which slightly protrudes coaxially and radially inward from the inner wall thereof along the entire circumference at a position adjacent to and located axially inward with respect to the groove portion 52. The positioning protrusion 53 is not necessarily formed along the entire circumference, but may be formed along a partial circumference. Also, the positioning protrusion 53 may be omitted as needed.

The outer surface of the outer layer 51 protrudes radially outward along the entire circumference over an axial range of from a position corresponding to the axially inward end of the straight portion 51a to a position located slightly axially outward with respect to the groove portion 52, thereby forming an annular protrusion 54 so as to compensate a reduction in the wall thickness of the outer layer 51 associated with formation of the groove portion 52. Also, an annular slight protrusion 55 protrudes radially outward from the outer surface of the outer layer 51 along the circumference at a position located in the vicinity of the axially outward end of the straight portion 51a. A portion of the outer surface of the outer layer 51 extending between the annular protrusion 54 and the annular protrusion 55 serves as a clamp portion 56, onto which a ring-shaped clamp member 25, which will be described later, is fitted for clamping.

The inner layer 58 is made of a resin of low gasoline permeability and assumes the form of thin-walled bellows. An axially outward end portion 58a of the inner layer 58 is fitted into the groove portion 52 and to the annular positioning protrusion 53 adjacent to the groove portion 52. An axially inward portion of the inner layer 58 subsequent to the axially outward end portion 58a assumes the form of bellows of regular pitches. The pitch of bellows of the inner layer 58 is less than that of the outer layer 51. The inner layer 58 functions as a barrier layer against permeation of gasoline and favorably assumes the form of a single layer or multilayer of, for example, PA6, PA11, PA12, PVDF, ETFE, THV, PBN, PBT, or PPS. The inner layer 58 is formed through blow-forming. The inner layer 58 is inserted into the outer layer 51 such that the axially outward end portion 58a is fitted into the groove portion 52, thereby being fixedly positioned coaxially within the outer layer 51.

Figure 12:
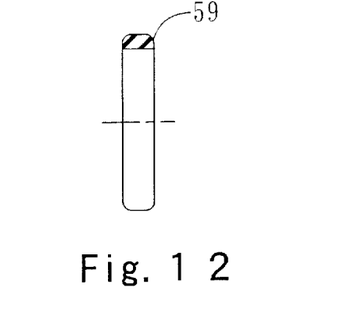
FIG. 12 is a partially sectional view showing a seal rubber of the fuel hose of FIG. 10.

As in the case of the previously described seal member 19, the seal member 59 is made of, for example, FMK, H-NBR, NBR/PVC, or NBR, which are resistant to gasoline. The seal member 59 has a radial thickness of 0.5 mm to 5 mm, an axial length of 2 mm to 50 mm, and an outer diameter of 20 mmφ to 50 mmφ. The outer diameter of the seal member 59 is about 0 mm to 5 mm greater than the inside diameter of the groove portion 52 as measured with the inner layer 58. The seal member 59 is not necessarily of low gasoline permeability. The seal member 59 is not necessarily bonded to the groove portion 52, but may merely be fitted into the groove portion 52.

Figure 13A:
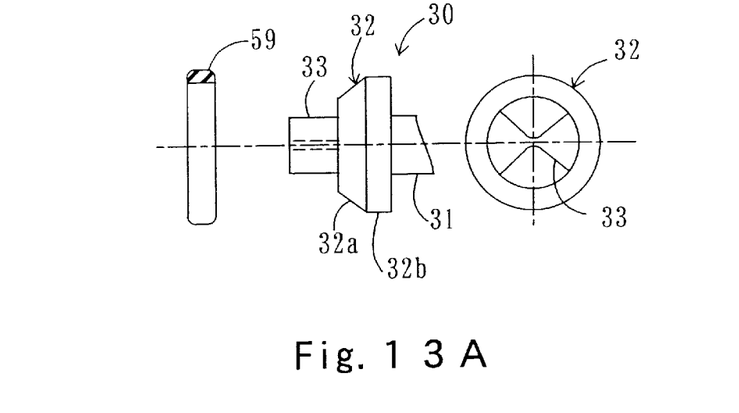
FIGS. 13A and 13B are views for explaining attachment of a seal member into a fuel hose.
Figure 13B:
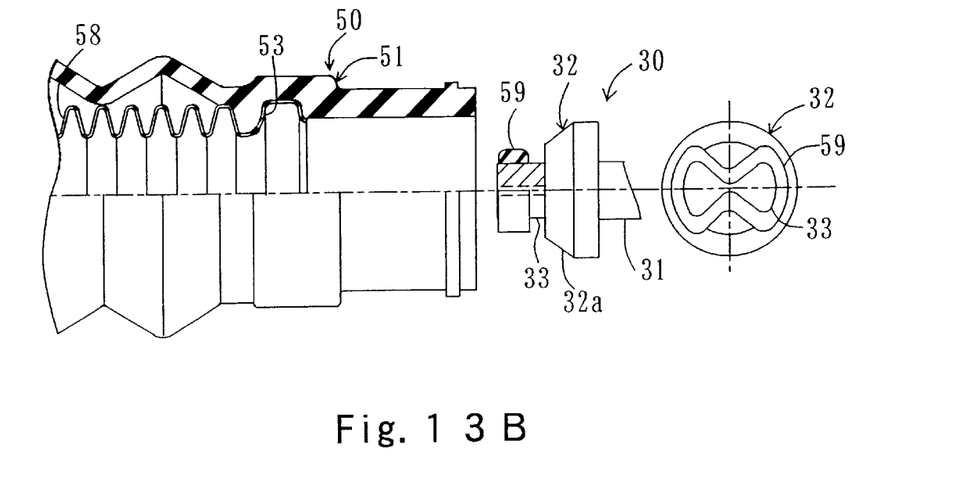

The seal member 59 is inserted into the groove portion 52 through the opening of the outer layer 51 by use of the mounting jig 30 as shown in FIG. 13A as in the case of insertion of the seal member 19 into the groove portion 12. As shown in FIG. 13B, the seal member 59 is attached to the mounting portion 33 along the contour shaped in the number "8". However, a method for fitting the seal member 59 into the groove portion 52 is not limited thereto.

The mating pipe 21 (mating member) is as described previously. The diameter of the engagement protrusion 22 is slightly greater than the inside diameter of the straight portion 51a of the outer layer 51. The mating pipe 21 is inserted under pressure into the straight portion 51a of the outer layer 51 and is fixed securely in place while the engagement protrusion 22 is fitted into the groove portion 52 located at the axially inward end of the straight portion 51a, via the inner layer 58 and the annular seal member 59, to thereby press the seal member 59 radially outward. Subsequently, the ring-shaped clamp member 25 is mounted on the outer surface of the clamp portion 56 of the outer layer 51 and clamps the clamp portion 56 to thereby firmly connect the fuel hose 50 and the mating pipe 21.

In the above-described second embodiment, the engagement protrusion 22 of the mating pipe 21 is fixedly fitted into the groove portion 52 formed at the axially inward end of the straight portion 51a of the outer layer 51 via the inner layer 58 made of a resin material of low gasoline permeability and the annular seal member 59, thereby sufficiently preventing permeation of gasoline and thus satisfying a strict requirement for advanced low gasoline permeability. Also, most of a press-fit path of the fuel hose 50 along which the mating pipe 21 is inserted under pressure is formed of the outer layer 51, which is soft. Insertion of the mating pipe 21 involves radially outward expansion of the inner layer 58, which is hard, at merely one end portion of the path; i.e., at the groove portion 52. Thus, an insertion load which arises during insertion of the mating pipe 21 can be low, thereby enhancing work efficiency in the insertion.

The outer layer 51 protrudes coaxially and radially inward at a position adjacent to and located axially inward with respect to the groove portion 52 of the fuel hose 50 so as to form the annular positioning protrusion 53. The positioning protrusion 53 reliably blocks an axially inward movement of the seal member 59 and the mating pipe 21 beyond an engagement end position; i.e., beyond the groove portion 52. Thus, the seal member 59 and the mating pipe 21 can be fitted into the groove portion 52 accurately and easily.

Next, a modified fuel hose connection structure of the above-described second embodiment will be described.

Figure 14:
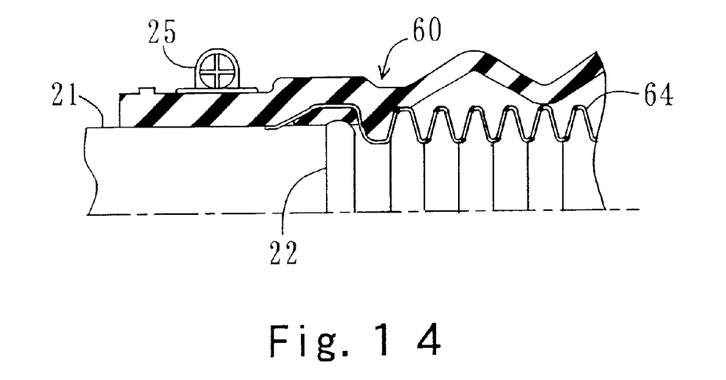
FIG. 14 is a sectional view showing an upper half of a fuel hose connection structure according to a modification of the second embodiment.
Figure 15:
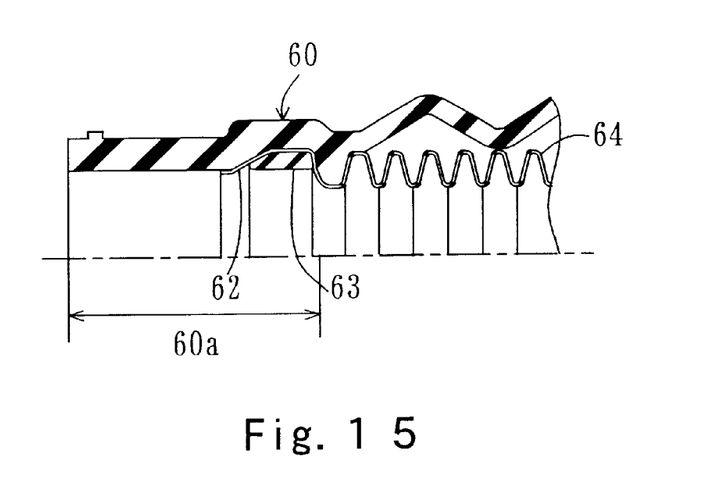
FIG. 15 is a sectional view showing an upper half of a fuel hose of the fuel hose connection structure of FIG. 14.
Figure 16:
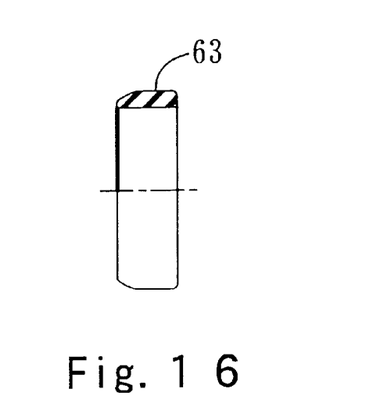
FIG. 16 is a partially sectional view showing a seal rubber of the fuel hose of FIG. 15.

As shown in FIGS. 14 to 16, according to the modified embodiment, a groove portion 62 formed at an insertion end portion 60a of a fuel hose 60 is formed such that the axial length is slightly longer than that of the above-mentioned groove portion 52 and such that one end portion is tapered off, thereby assuming an axial cross section of a trapezoidal shape. The shape of an insertion end portion of an inner layer 64 is modified according to the shape of the groove portion 62. Also, a seal member 63 assumes an axial cross section of a trapezoidal shape. Other configuration features are similar to those of the second embodiment.

Since one end portion of the groove portion 62 is tapered off, the inner layer 64 is readily deformed in the radially outward direction, thereby facilitating mounting of the seal member 63 into the groove portion 62 and insertion of the mating pipe 21. Since a seal portion implemented by means of the groove portion 62 and the seal member 63 assumes an axial length longer than that of the second embodiment, permeation of gasoline from a connection with the mating pipe 21 can be suppressed more reliably.

The above-described inner layer 58, 64 is usually formed separately from the outer layer 51 and is inserted into the outer layer 51. Alternatively, an inner layer may be directly formed and disposed within the outer layer 51 in an uncontacted condition through blow-forming.

The fuel hose connection structures shown in the above-described embodiments are mere examples. The present invention may be embodied in many other specific forms without departing from the spirit or scope of the invention.

What is claimed is:

1. A fuel hose connection structure comprising:
a fuel hose having a straight insertion end portion at an axial end thereof, a tubular outer layer made of an elastic material and having an annular groove portion formed in an inner wall of the tubular outer layer at an axially inward end of the straight insertion end portion, the annular groove portion being formed coaxially with the inner wall along the entire circumference of the inner wall, a thin-walled inner layer made of a resin material of low gasoline permeability and fixedly bonded to a portion of the inner wall, the portion including at least the annular groove portion and extending axially inward from the annular groove portion, and a thick-walled annular seal member made of an elastic material of low gasoline permeability different from the outer layer and fitted tightly into the annular groove portion entirely lined with the thin-walled inner layer such that the thick-walled annular seal member is entirely partitioned from the tubular outer layer;
a tubular mating member including an annular engagement protrusion formed at an end portion thereof along the entire circumference of the tubular mating member in such a manner as to protrude radially outward, the tubular mating member being inserted under pressure from the end portion into the straight insertion end portion of the fuel hose such that the annular engagement protrusion is engaged with the annular groove portion while the annular engagement protrusion presses radially outward on the annular seal member fitted into the annular groove portion; and an annular clamp member fitted onto the tubular outer layer at a position located axially outward with respect to the annular groove portion and adapted to tighten the tubular outer layer securely so as to connect the tubular mating member and the fuel hose in a fluid-tight condition.

2. A fuel hose connection structure according to claim, 1, wherein the tubular outer layer and the thin-walled inner layer protrude coaxially and radially inward at a position adjacent to and located axially inward with respect to the annular groove portion so as to form an annular positioning protrusion.

3. A fuel hose connection structure according to claim 1, wherein the tubular outer layer comprises an elastic material selected from the group consisting of a fluorine-containing rubber, an acrylonitrile butadiene rubber, an acrylonitrile butadiene rubber/polyvinyl chloride, an acrylic rubber, a hydrogenated acxylonitrile butadiene rubber, and an epichlorohydrin rubber.

4. A fuel hose connection structure according to claim 1, wherein the thin-walled inner layer comprises a fluoroplastic resin material selected from the group consisting of a vinylidene fluoride and a vinylidene fluoride-chlorotrifluoroethylene copolymer.

5. A fuel hose connection structure according to claim 1, wherein the annular seal member comprises an elastic material selected from the group consisting of a fluorine-containing rubber, an acrylonitrile butadiene rubber, an acrylonitrile butadiene rubber/polyvinyl chloride, and a hydrogenated acrylonitrile butadiene rubber.

6. A fuel hose according to claim 1, wherein the annular seal member comprises an elastic material selected from the group consisting of a fluorine-containing rubber, an acrylonitrile butadiene rubber, an acrylonitrile butadiene rubber/polyvinyl chloride, and a hydrogenated acrylonitrile butadiene rubber.

7. A fuel hose comprising:
    a straight insertion end portion at an axial end thereof;
    a tubular outer layer made of an elastic material, the tubular outer layer having an annular groove portion formed in an inner wall of the tubular outer layer at an axially inward end of the straight insertion end portion and an annular positioning protrusion portion on the inner wall at axially inward of and adjacent to the annular groove portion, the annular groove portion being formed coaxially with the inner wall along the entire circumference of the inner wall;
    a thin-walled inner layer made of a resin material of low gasoline permeability and fixedly bonded to a portion of the inner wall, the portion including at least the annular groove portion and extending axially inward from the annular groove portion; and
    a thick-walled annular seal member made of an elastic material of low gasoline permeability different from the outer layer and fitted tightly into the annular groove portion entirely lined with the thin-walled inner layer such that the thick-walled annular seal member is entirely partitioned from the tubular outer layer and positioned radially outward with respect to the annular positioning protrusion portion;
    wherein:
        the straight insertion end portion is configured to receive a tubular mating member having an annular engagement protrusion protruding radially outward at an end portion thereof along the entire circumference of the tubular mating member under pressure such that the annular engagement protrusion is engaged with the annular groove portion while the annular engagement protrusion presses radially outward on the annular seal member fitted into the annular groove portion; and
        the tubular outer layer is configured to be fitted with an annular clamp member at a position located axially outward with respect to the annular groove portion in such a manner as to tighten the tubular outer layer securely so as to connect the tubular mating member and the fuel hose in a fluid-tight condition.

8. A fuel hose according to claim 7, wherein the tubular outer layer comprises an elastic material selected from the group consisting of a fluorine-containing rubber, an acrylonitrile butadiene rubber, an acrylonitrile butadiene rubber/polyvinyl chloride, an acrylic rubber, a hydrogenated acrylonitrile butadiene rubber, and an epichlorohydrin rubber.

9. A fuel hose according to claim 7, wherein the thin-walled inner layer comprises a fluoroplastic resin material selected from the group consisting of a vinylidene fluoride and a vinylidene fluoride-chlorotrifluoroethylene copolymer.

10. A fuel hose connection structure comprising:
    a fuel hose having a straight insertion end portion at an axial end thereof, a tubular outer layer made of an elastic material and having an annular groove portion formed in an inner wall of the tubular outer layer at an axially inward end of the straight insertion end portion, the annular groove portion being formed coaxially with the inner wall along the entire circumference of the inner wall, an inner layer of low gasoline permeability having a thin-walled tube form and made of resin, the inner layer being inserted into and detachably disposed coaxially within the tubular outer layer, the inner layer having an axially outward end portion fitted into the annular groove portion, and a thick-walled annular seal member made of an elastic material of low gasoline permeability different from the outer layer and fitted tightly into the annular groove portion entirely lined with the axially outward end portion of the inner layer such that the thick-walled annular seal member is entirely partitioned from the tubular outer layer;
    a tubular mating member having an annular engagement protrusion formed at an end portion thereof along the entire circumference of the tubular mating member in such a manner as to protrude radially outward, the tubular mating member being inserted under pressure from the end portion into the straight insertion end portion of the fuel hose such that the annular engagement protrusion is engaged with the annular groove portion while the annular engagement protrusion presses radially outward on the annular seal member fitted into the annular groove portion; and
    an annular clamp member fitted onto the tubular outer layer at a position located axially outward with respect to the annular groove portion and adapted to tighten the tubular outer layer securely so as to connect the tubular mating member and the fuel hose in a fluid-tight condition.

11. A fuel hose connection structure according to claim 10, wherein the tubular outer layer protrudes coaxially and radially inward at a position adjacent to and located axially inward with respect to the annular groove portion so as to form an annular positioning protrusion.

12. A fuel hose connection structure according to claim 10, wherein the tubular outer layer comprises an elastic material selected from the group consisting of a fluorine-containing rubber, an acrylonitrile butadiene rubber, an acrylonitrile butadiene rubber/polyvinyl chloride, an acrylic rubber, a hydrogenated acrylonitrile butadiene rubber, and an epichlorohydrin rubber.

13. A fuel hose connection structure according to claim 10, wherein the inner layer comprises a fluoroplastic resin material selected from the group consisting of a vinylidene fluoride and a vinylidene fluoride-chlorotrifluoroethylene copolymer.

14. A fuel hose connection structure according to claim 10, wherein the annular seal member comprises an elastic material selected from the group consisting of a fluorine-containing rubber, an acrylonitrile butadiene rubber, an acrylonitrile butadiene rubber/polyvinyl chloride, and a hydrogenated acrylonitrile butadiene rubber.

15. A fuel hose comprising:
   a straight insertion end portion at one axial end thereof;
   a tubular outer layer made of an elastic material, the tubular outer layer having an annular groove portion formed in an inner wall of the tubular outer layer at an axially inward end of the straight insertion end portion and an annular positioning protrusion portion on the inner wall at axially inward of and adjacent to the annular groove portion, the annular groove portion being formed coaxially with the inner wall along the entire circumference of the inner wall;
   an inner layer of low gasoline permeability having a thin-walled tube form and made of resin, the inner layer being inserted into and detachably disposed coaxially within the tubular outer layer, the inner layer having an axially outward end portion fitted into the annular groove portion; and
   a thick-walled annular seal member made of an elastic material of low gasoline permeability different from the outer layer and fitted tightly into the annular groove portion entirely lined with the axially outward end portion of the inner layer such that the thick-walled annular seal member is entirely partitioned from the tubular outer layer and positioned radially outward with respect to the annular positioning protrusion portion;
wherein:
   the straight insertion end portion is configured to receive a tubular mating member having an annular engagement protrusion protruding radially outward at an end portion thereof along the entire circumference of the tubular mating member under pressure such that the annular engagement protrusion is engaged with the annular groove portion while the annular engagement protrusion presses radially outward on the annular seal member fitted into the annular groove portion; and
   the tubular outer layer is configured to be fitted with an annular clamp member at a position located axially outward with respect to the annular groove portion in such a manner as to tighten the tubular outer layer securely so as to connect the tubular mating member and the fuel hose in a fluid-tight condition.

16. A fuel hose according to claim 15, wherein the tubular outer layer comprises an elastic material selected from the group consisting of a fluorine-containing rubber, an acrylonitrile butadiene rubber, an acrylonitrile butadiene rubber/polyvinyl chloride, an acrylic rubber, a hydrogenated acrylonitrile butadiene rubber, and an epichlorohydrin rubber.

17. A fuel hose according to claim 15, wherein the inner layer comprises a fluoroplastic resin material selected from the group consisting of a vinylidene fluoride and a vinylidene fluoride-chlorotrifluoroethylene copolymer.

18. A fuel hose according to claim 15, wherein the annular seal member comprises an elastic material selected from the group consisting of a fluorine-containing rubber, an acrylonitrile butadiene rubber, an acrylonitrile butadiene rubber/polyvinyl chloride, and a hydrogenated acrylonitrile butadiene rubber.

\* \* \* \* \*